US007346067B2

(12) United States Patent
Chung et al.

(10) Patent No.: US 7,346,067 B2
(45) Date of Patent: Mar. 18, 2008

(54) HIGH EFFICIENCY DATA BUFFERING IN A COMPUTER NETWORK DEVICE

(75) Inventors: Heeloo Chung, San Francisco, CA (US); Eugene Lee, San Jose, CA (US)

(73) Assignee: Force 10 Networks, Inc., San Jose, CA (US)

( * ) Notice: Subject to any disclaimer, the term of this patent is extended or adjusted under 35 U.S.C. 154(b) by 891 days.

(21) Appl. No.: 09/990,753

(22) Filed: Nov. 16, 2001

(65) Prior Publication Data

US 2003/0095558 A1 May 22, 2003

(51) Int. Cl.
*H04L 12/28* (2006.01)
*H04L 12/56* (2006.01)
(52) U.S. Cl. .................. 370/412; 370/413; 370/429
(58) Field of Classification Search .............. 370/412
See application file for complete search history.

(56) References Cited

U.S. PATENT DOCUMENTS

| 6,687,247 | B1* | 2/2004 | Wilford et al. ............. 370/392 |
| 6,757,795 | B2* | 6/2004 | Barri et al. .................. 711/158 |
| 2002/0163922 | A1* | 11/2002 | Dooley et al. .............. 370/412 |
| 2003/0016686 | A1* | 1/2003 | Wynne et al. .............. 370/412 |
| 2003/0084246 | A1* | 5/2003 | Tran et al. ................... 711/122 |

OTHER PUBLICATIONS

Stallings, William. "Data and Computer Communications". Prentice Hall. 1997. pp. 528-529.*

* cited by examiner

*Primary Examiner*—Chirag G. Shah

(57) ABSTRACT

A network processing device stores and aligns data received from an input port prior to forwarding the data to an output port. Data packets arrive at various input ports already having an output queue or virtual output queue assigned. A buffer manager groups one or more packets destined for the same output queue into blocks, and stores the blocks in a buffer memory. A linked list is created of the trunks, which is an ordered collection of blocks. The trunks are sent to a high speed second memory and stored together as a unit. In some embodiments the trunks are split on boundaries and stored in a high speed memory. Once the trunks are stored in the high speed second memory, the corresponding data is erased from the write combine buffer memory and the pointers that made up the linked list are returned to a free block pointer pool. The data can then be read from the high speed second memory very quickly, passed through a switching fabric, and placed back on the computer network for its next destination. In other embodiments, the trunk data is stored after passing through the switching fabric, before being placed back on the computer network.

33 Claims, 10 Drawing Sheets

HIGH EFFICIENCY DATA BUFFERING IN A COMPUTER NETWORK DEVICE

TECHNICAL FIELD

This invention generally relates to computer networking devices, and, more specifically, to a system for buffering data between input and output ports of a networking device.

BACKGROUND OF THE INVENTION

Network interconnection devices, such as routers, switches, gateways and concentrators, etc., include input and output ports that respectively receive and retransmit data. Generally, these devices include multiple input and multiple output ports, and the ports may be coupled to similar or dissimilar networks. The function of a network interconnection device is to receive packets on an input port, examine each packet to determine its destination address, and then forward the packet to the output port most likely to ensure the packet's delivery to its destination. The network device temporarily stores the input packets while the device determines the correct output port and outputs the data on that port.

Packets arrive at the input ports of the network device at random time intervals, although an approximate average arrival rate is generally known. For example, at one input port two thousand packets could arrive every second for five seconds, and at another input port eight thousand packets could arrive in the first second and another two thousand packets four seconds later. The average packet receive rate is 2 thousand packets/second in both of these cases. Generally, the packets do not arrive at exact intervals like in the first example; instead, packets are more likely to arrive in a distribution as in the second example. Sometimes this distribution is called data bursting.

In order to keep up with the incoming bursting packet traffic, the network device stores the incoming packets as they enter the input ports prior to sending them out to the output port. Present devices temporarily store incoming packets in data buffers or FIFO (First-In, First-Out) queues until they are ready to be forwarded to the proper output port or ports. For multicast traffic, if the network device cannot service the packets in an allotted time period, the device rejects (or drops) the unserviceable packets. For unicast traffic, if the Virtual Output Queue (VOQ) is congested, the packets will be rejected (or dropped). Packet processing speed in a network device is limited by the amount of time required to read and write packets to and from memory buffers. As network traffic increases and router specifications require more data throughput, packets must be forwarded at much faster rates than the present rates while having the same or lower packet drop rates. Memory read and rewrite bottlenecks prevent the network device from processing packets at the highest packet rates.

The present invention addresses this and other problems associated with the prior art.

SUMMARY OF THE INVENTION

A network processing device stores and aligns data received from an input port prior to forwarding the data to an output port. Data packets arrive at various input ports already having an output queue or virtual output queue assigned. A buffer manager groups one or more packets destined for the same output queue into blocks, and stores the blocks in a buffer memory. A linked list is created of the trunks, which is an ordered collection of blocks. The trunks are sent to a high speed second memory and stored together as a unit. In some embodiments the trunks are split on boundaries and stored in a high speed memory. Once the trunks are stored in the high speed second memory, the corresponding data is erased from the write combine buffer memory and the pointers that made up the linked list are returned to a free block pointer pool. The data can then be read from the high speed second memory very quickly, passed through a switching fabric, and placed back on the computer network for its next destination. In other embodiments, the trunk data is stored after passing through the switching fabric, before being placed back on the computer network.

The foregoing and other features and advantages of the invention will become more readily apparent from the following detailed description of the invention that follows with reference to the accompanying drawings of embodiments thereof.

DETAILED DESCRIPTION

Figure 1:
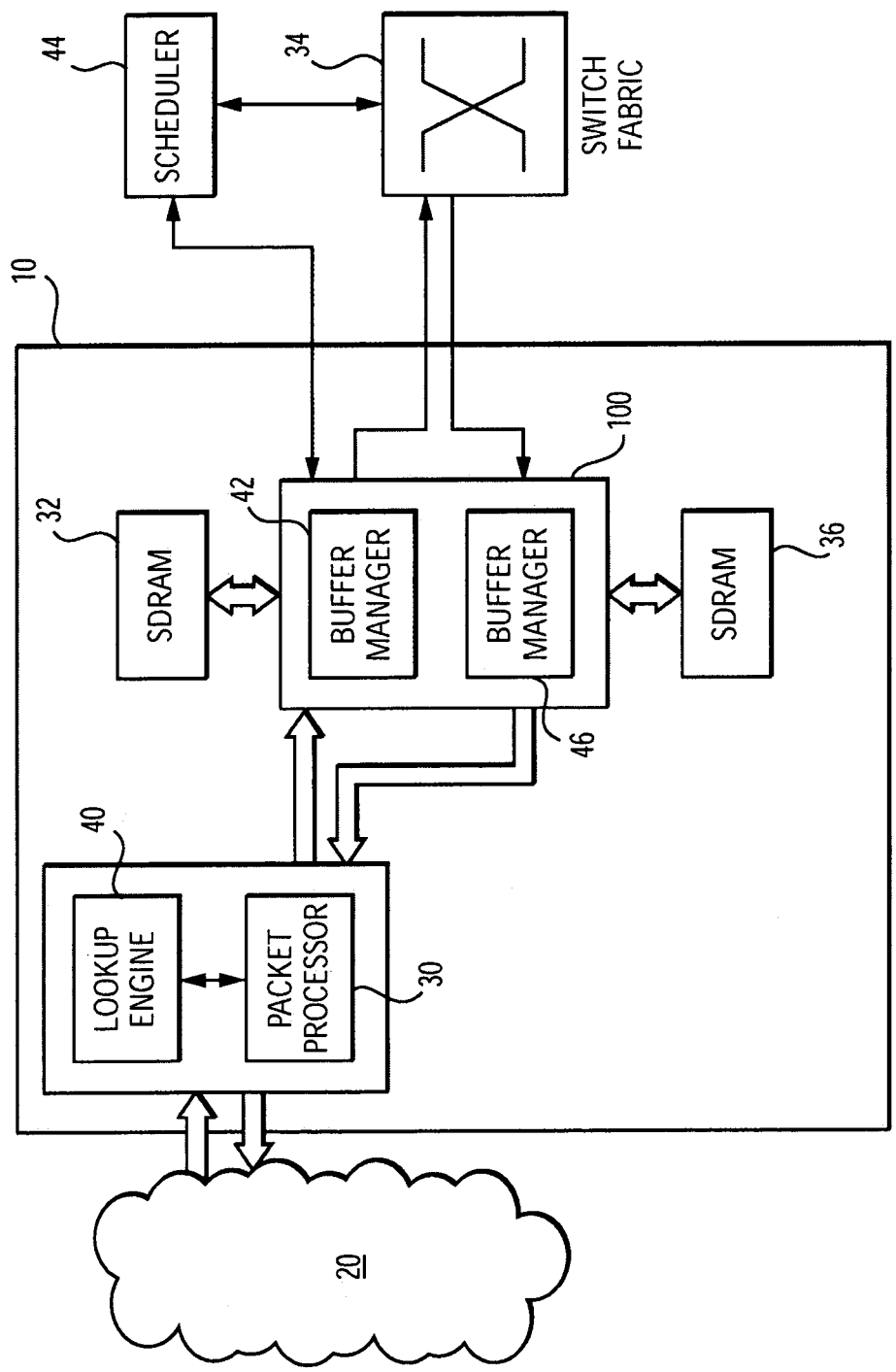
FIG. 1 is a functional block diagram of a network processing device that uses efficient data buffering according to embodiments of the invention.

Referring to FIG. 1, a network line interface card (LIC) 10 is coupled to one or more computer networks, such as the Internet 20. Data packets from the Internet 20 are received at a packet processor 30. Generally, the LIC 10 communicates with a controller 100 that supervises temporarily storing the packets in an input memory 32, assigning them to the proper output port, sending them through a switch fabric 34 to the assigned output port, and temporarily storing the packets in an output memory 36 prior to sending them through the assigned output port back onto to the Internet 20. In some embodiments, it may be possible to send data stored in the input memory 32 directly to the assigned output port without the intermediary step of storing the data in the output memory 36.

After packets are received at the packet processor 30, data in the headers in the individual packets is examined and, by using an attached lookup engine 40, an output queue or virtual output queue (VOQ) is assigned to the packet. The number of the assigned VOQ is encapsulated into an internal packet header in front of the original packet. The modified packets (containing the VOQ assignment and other information) are then sent to an input buffer manager 42 that determines where to temporarily store the packets within the input memory 32. In one embodiment of the invention, the input memory 32 is a Synchronous Dynamic Random Access Memory (SDRAM) circuit but could be any high speed memory device. The status information of each VOQ is passed from the input buffer manager 42 to a scheduler 44. The scheduler 44 performs switch fabric scheduling, and determines which group of VOQ's packets should be removed from the input memory 32 and passed through the switch fabric 34. After passing through the switch fabric 34, the packets may be stored in the output memory 36 (which like the input memory 32 may also be an SDRAM or other high speed circuit) with the help of the output buffer manager 46. When the assigned output port 18 (not shown in FIG. 1) is free, the packet is retrieved from the output memory 36 (or directly from the input memory 32) and sent back to the Internet 20. In various embodiments, the controller 100 may include separate input and output buffer managers 42, 46, or they could also be combined into one manager.

Figure 2:
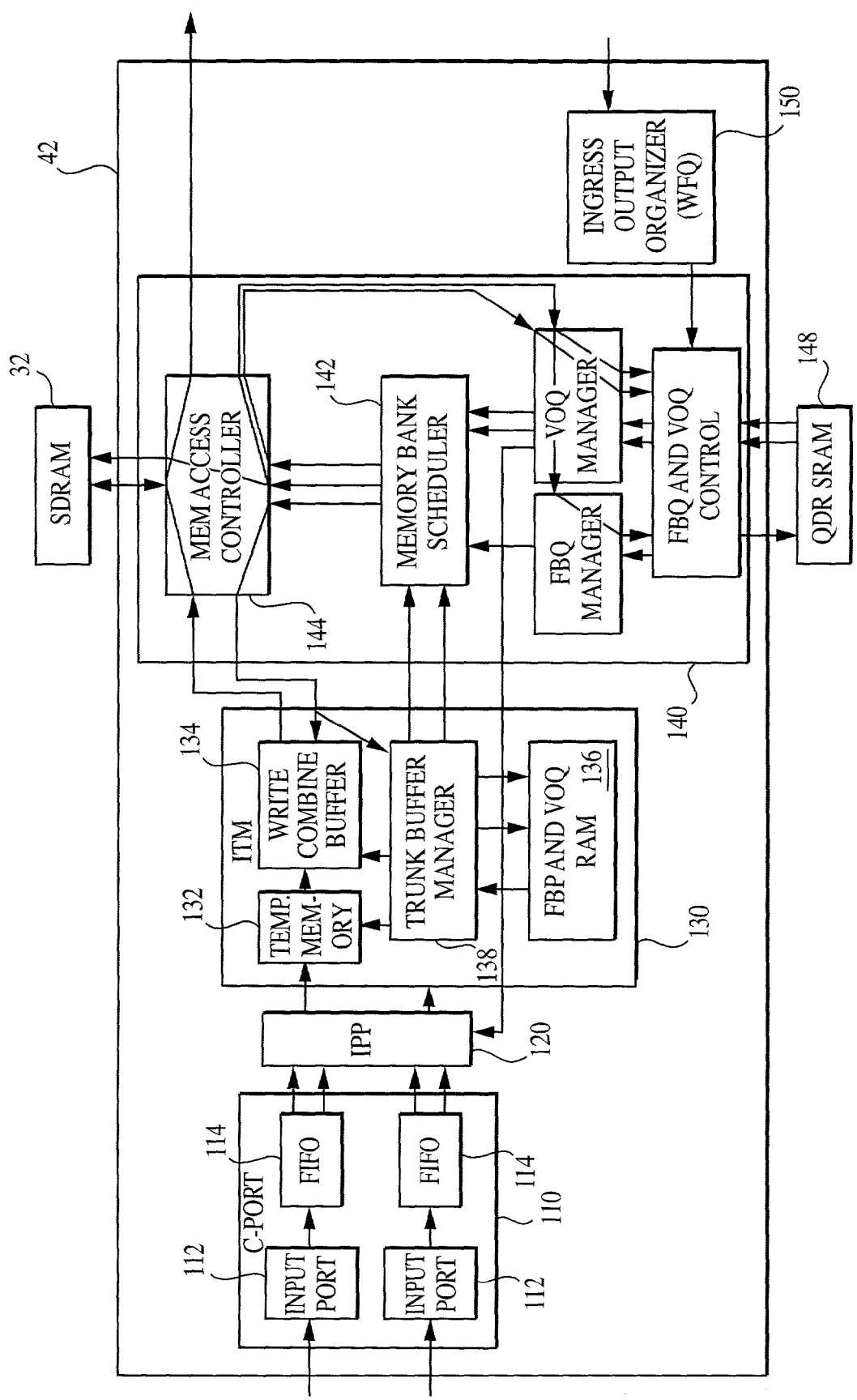
FIG. 2 is a functional block diagram of components of the network processing device shown in FIG. 1.
Figure 3:
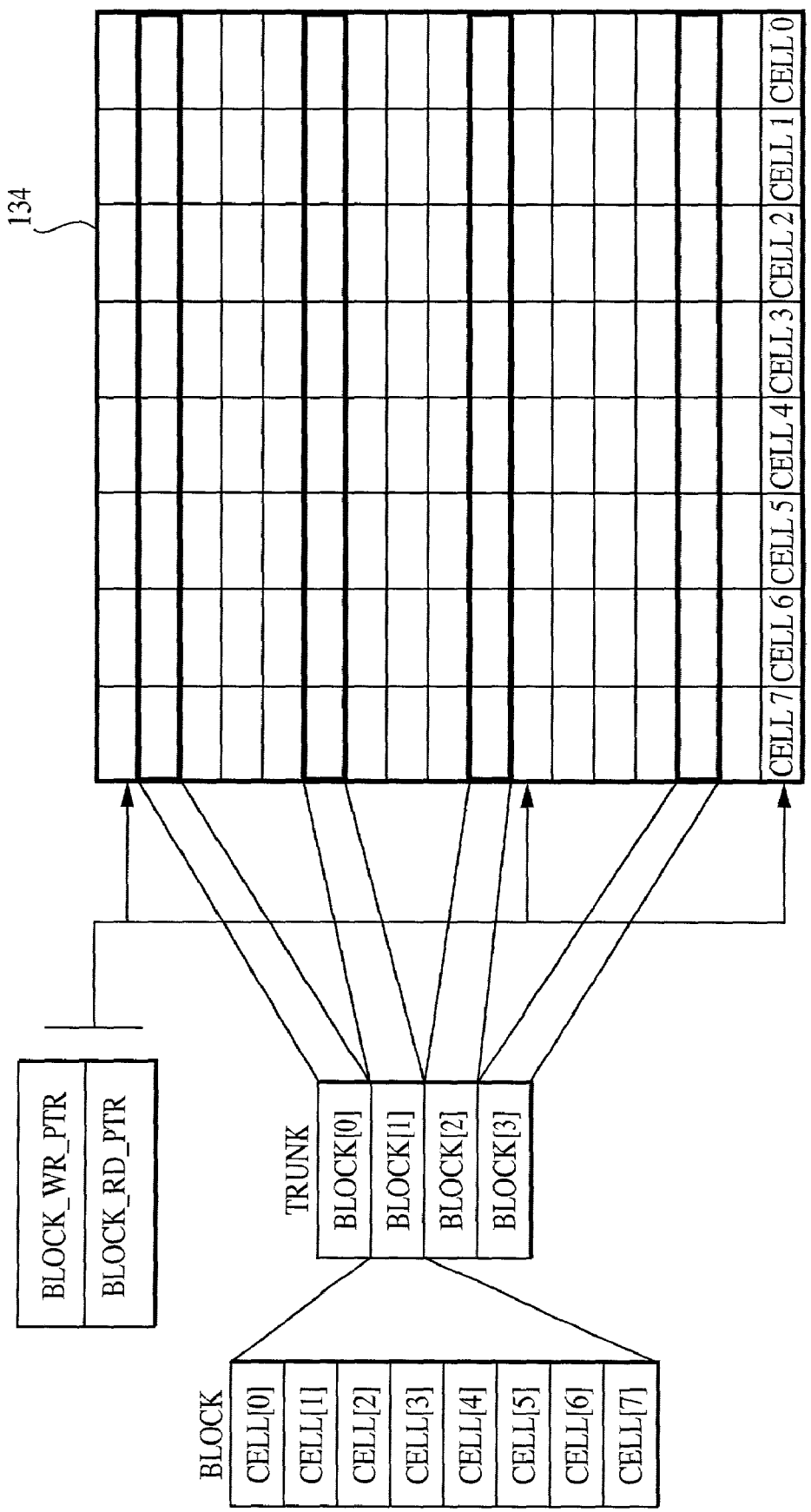
FIG. 3 is a block diagram showing alignment of data to be stored in a memory portion of the network device.

With reference to FIG. 2, components of a buffer management system according to embodiments of the invention are shown. Components that process the incoming packets within a buffer manager 42 include a C-port block 110 that accepts the packets arriving at random intervals and passes incoming packets and commands to an Ingress Packet Processor (IPP) 120. After performing packet processing, the IPP 120 passes the packets and commands to an Ingress Trunk Manager (ITM) 130 that aligns the packets as best it can on "trunk" boundaries and stores the trunks in a write combine buffer memory 134 within the ITM. The write combine buffer memory 134 is preferably a Static Random Access Memory (SRAM) that has better direct addressing and does not need to be refreshed like Dynamic RAM (DRAM), but the buffer memory can be any memory suitable for the task. Trunks are groups of data that are generally logically grouped, such as different packets destined for the same VOQ. In one example embodiment, shown in FIG. 3, each trunk is made from a group of 4 blocks, each block is made from a group of 4 or 8 cells, and each cell is made from a group of 12 or 6 bytes. Therefore, in this embodiment, each trunk is made of 192 bytes of data that will be eventually stored in the SDRAM 32 as a single unit that can be read very quickly, as further discussed below.

Referring back to FIG. 2, the ITM 130 passes commands and data addresses to an ingress buffer manager 140 that coordinates when and where to store the trunks of data in the input SDRAM 32. Eventually, the packet data stored on trunk boundaries is extracted from the SDRAM 32 at a very high rate and sent back out to the Internet 20 through the desired output port assigned to the particular VOQ. Determining how the packet data is moved into and out from the write combine buffer memory 134 and into and out from the SDRAM 32 is a central focus of FIG. 2, and will be discussed in detail below.

Early Stages of Ingress Packet Flow

Figure 4:
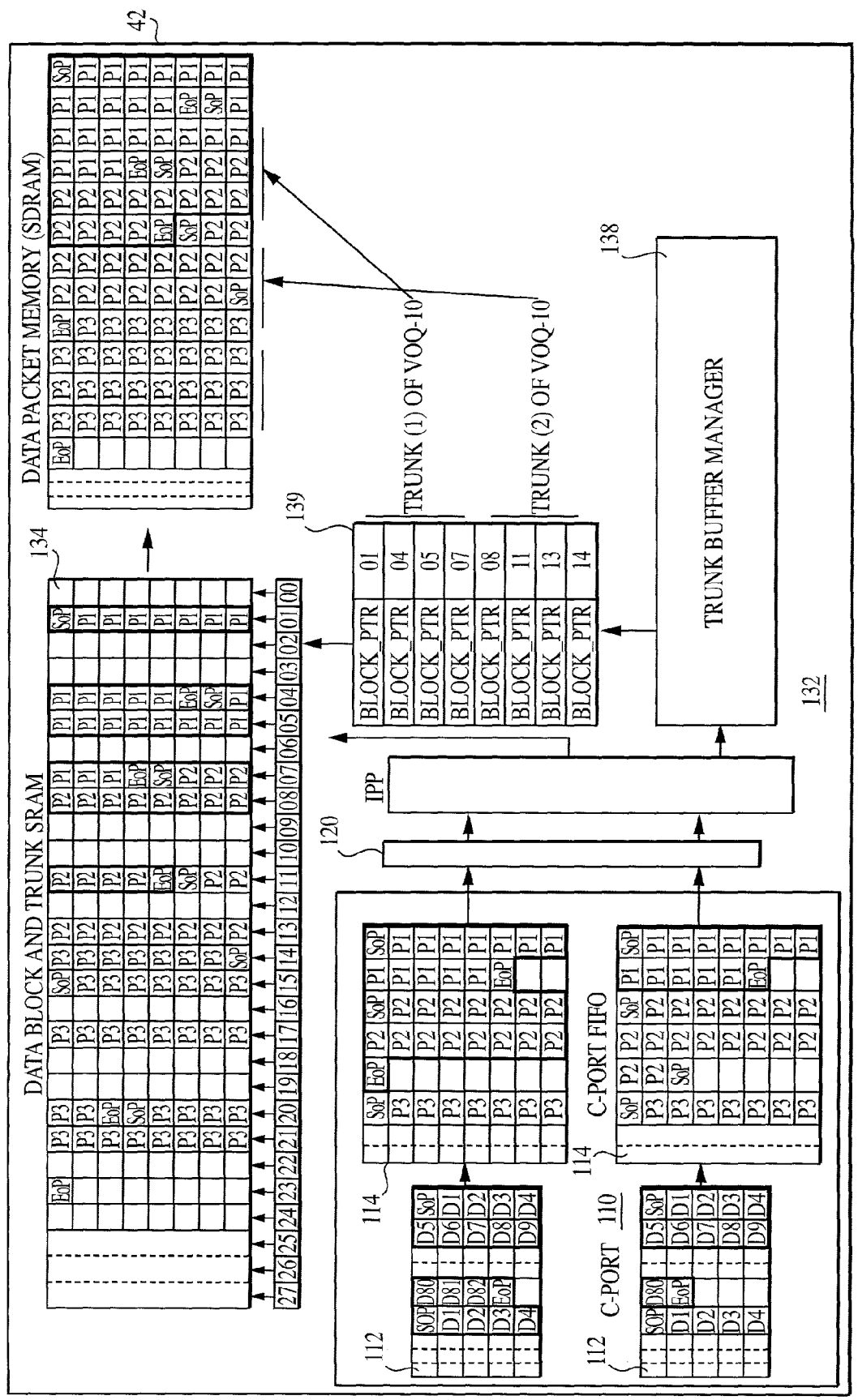
FIG. 4 is a block diagram showing locations of various packets within memory devices in the network processing device according to an embodiment of the invention.

FIG. 4 shows a more detailed view of data packets arriving at the buffer manager 42 and where the data is stored within the device. Each C-port block 110 contains physical input ports 112, which receive packet data, and a set of FIFO queues 114, which temporarily store the received packet data. A C-port block 110 can have as many input ports 112 as necessary and is not limited to the two ports shown in FIG. 4. Nor is it strictly necessary that each physical input port 112 links directly to its own FIFO queue 114, but the C-port block 110 is generally implemented in this way. As mentioned above, the packets enter the physical input ports 112 in random time intervals and are temporarily buffered in the FIFO queues 114 in the same order as they arrived.

By the time the packets have entered the C-port block 110, they have already been assigned to a particular VOQ by the lookup engine 40 (FIG. 1). The VOQ to which the packet is assigned, as well as other data and commands are present in a header of each packet.

The FIFO 114 queues are read regularly and the data that was read from them is deleted to make room for additional packet data to be received by the C-port block 110. The FIFO 114 queues may collect data over a relatively large period of time prior to reading the accumulated data in a large chunk. Packet data read from the FIFO queues is sent to the IPP 120, which performs packet filtering, prioritizing of packet routing, traffic monitoring, etc.

Aligning Packets into Trunks

In some embodiments, packets from the IPP 120 are sent to a temporary memory 132, which is part of the ITM 130 shown in FIG. 2. The temporary memory 132 stores the packet data once it has left the IPP 120 and before it has been grouped into trunks in order to align the packet data. Aligning the packet data includes assigning the packets to blocks and trunks prior to storing it into the write combine buffer 134. The trunk alignment requires pointers and memory locations to be assigned prior to the data being written in the write combine buffer 134, and therefore the data is be temporarily stored in the temporary memory 132 while pointers and memory locations are assigned.

Once the data and commands are sent from the IPP 120 to the ITM 130 (FIG. 2), the process of storing the packet data into the write combine buffer 134 begins. The following description is one method for storing the packet data within the write combine buffer 134, but variations, modifications, and other methods could be used and still stay within the spirit and scope of the invention.

As mentioned above, the data is temporarily stored into the temporary memory 132 while the ITM 130 determines where in the write combine buffer 134 the packet data will be stored. A first step in determining where to store the packet data is to find information about the data packet. When the IPP 120 delivers the packet to the ITM 130, it sends information about the packet itself, such as the assigned VOQ number of the packet and the length of the packet. Once the packet information is known, the ITM 130 stores the packet in an appropriate memory location in the write combine buffer 134. A trunk buffer manager 138, which is a component of the ITM 130, makes the determination of where in the write combine buffer 134 the packet will be stored.

One of the unique features in implementations of the trunk manager 138 is the way in which it assigns packet data to particular trunks. Instead of simply placing each packet in its own trunk, the trunk manager 138 intelligently groups multiple packets of data in each trunk. For instance if three packets were each destined to the same VOQ, the trunk manager 138 could operate to have them stored within the same trunk of the write combine buffer 134, provided there was enough room in the trunk. By storing related packets (e.g., such as for the same VOQ) in the same trunk, the data can be moved into and out of the high speed memory SDRAM 32 at much faster rates than was previously possible. This gives much higher efficiency for the SDRAM access. In addition to storing multiple packets within one trunk boundary, the trunk buffer manager 138 can also subdivide a single packet over more than one trunk. This is especially useful when an incoming packet is very large.

As mentioned above, trunks are made of 4 blocks, and blocks are made of 4 or 8 cells of data. FIG. 4 shows individual blocks 00, 01, 02, . . . , 27, each made up of 8 cells. Of course there can be more than 28 blocks in a write combine buffer 134, and a typical implementation in a network device installation may include 1024 blocks or any other acceptable number. Prior to storing data in the write combine buffer 134 it must be ensured that the data is being written to a block that has no other data in it. These blocks are called free blocks.

In one embodiment, a system of pointers is used to determine which blocks in the write combine buffer 134 are free blocks. A pointer stored in a Free Block Pool (FBP) 136 (shown in FIG. 2) points to a block number (00-27 in this example) of the write combine buffer 134 (in FIGS. 3 and 4) that is currently not storing any data. Such pointers are called "write" pointers because they indicate free blocks where data can be written. Similarly there is a set of "read" pointers that indicates where data already written in the write combine buffer 134 is stored, which will be discussed below. The read and write pointers can be implemented in any of a number of ways, for instance by a linked list of free pointers, where a given pointer always points to a next free block in the list. Alternatively, there may be sets of lists for each write combine buffer 134 where, for example, there are 4 or 8 linked lists of pointers to free blocks, each operating more or less independently. This situation could be advantageous for interleaving the trunks within the write combine buffer 134 to increase the speed at which the data stored therein can be accessed. Other methods of implementing the FBP can be implemented without undue experimentation by those skilled in the art by using other types of lists, queues or stacks, for example.

Once the trunk buffer manager 138 receives the pointer information from the FBP to set up a trunk, it creates a trunk and stores that trunk in the write combine buffer 134. In creating the trunk, the trunk buffer manager 138 generates the necessary information needed to store the trunk in the write combine buffer 134. Such information can include, for instance, the memory address where the trunk begins, how many and which packets are in the trunk, where in the trunk is the last valid byte, etc. Additionally, the trunk buffer manager knows the VOQ of the trunk, the size of the trunk, the number of cells in the last packet in the current trunk, where the last byte is stored in the trunk, etc. Once the trunk buffer manager 138 records the information about the trunk, the entire trunk is stored in the write combine buffer 134 using standard memory techniques. If the trunk is not full when it is created, i.e. it does not contain 192 bytes for the above example, then the trunk manager 138 can add additional packets to the trunk as they are received by the IPP 120 until the trunk is complete, or until the trunk is eventually moved out of the write combine buffer 134.

As the trunk is set up, the trunk manager 138 creates a linked list for each of the VOQs in the network device, which can also be stored in the FBQ/VOQ RAM 136 (FIG. 2). The linked list contains entries of block read pointers that are used to make up the particular trunk assigned to that VOQ. FIG. 4 shows the contents of a linked list 139 for an example VOQ 10. The linked list 139 contains block read pointers that make up two trunks, trunk 1 and trunk 2. Of course, the linked list 139 can contain any of a number of trunks for each VOQ, and only two are shown here for simplicity.

In FIG. 4, the first trunk of VOQ 10 includes a set of 4 block pointers. Recall that in the illustrated example (FIG. 3), each trunk is made of 4 blocks and each block is made of 8, six-byte cells. If it is desired to have larger trunks (for performance considerations), the linked list 139 is simply made longer. Trunk 1 of VOQ 10 includes blocks 01, 04, 05 and 07, in that order. Note that any of the blocks in the write combine buffer 134, in any order, can make up each trunk. Trunks are not limited to sequential blocks and the blocks need not even be in numerical order. For instance, a trunk could be made from blocks 04, 07, 17, and 02, if those FBP write pointers had been given to the trunk buffer manager 138 from the FBP 136.

After the trunk buffer manager 138 loads the trunk data into the write combine buffer 134, it also updates the block read pointers in the linked list 139 for the particular VOQ.

Note that the above-described system allows packets to be received at random time intervals, temporarily stored in the temporary memory 132, then sorted and placed with other packets for the same VOQ in a trunk. Because most of the aligning and arranging is done with pointers instead of actually moving the packets from one memory location to another, this alignment can be done at very fast rates, and much faster than is currently possible if the above system is not used.

Once the packet data has been stored along trunk boundaries for a particular VOQ in the write combine buffer 134, the next major portion of the buffer management system moves the stored trunks to the SDRAM 32 so that they can be eventually output through the switch fabric 34 or back to the Internet 20.

In some embodiments, data is read from the write combine buffer 134 in trunk form. This means that when the data is ready to be read from the write combine buffer 134, the minimum element that can be read is one trunk. Trunks are ready to be read from the write combine buffer 134 when any of the following conditions are satisfied: when the trunk is fully loaded with data (192 bytes); when a trunk timer times out; or when the amount of trunk data stored in the write combine buffer 134 is above a threshold at the same time a number of trunks in the VOQ (which are sitting in the SDRAM 32) is below another threshold. When any of these conditions are satisfied, it is time to move the trunk data from the write combine buffer 134 to the SDRAM 32. This prevents traffic starvation and minimizes the network latency.

Storing Data Aligned on Trunk Boundaries into the High Speed RAM

To move the trunk data from the write combine buffer 134 to the SDRAM 32, the trunk buffer manager 138 issues a write request to a memory bank scheduler 142 (FIG. 2). The request includes the linked list 139 (FIG. 4) for the particular VOQ of the trunk to be moved. Because the trunk may not be completely full (192 bytes) when the trunk timer times out or when the thresholds require it, the linked list 139 may include 1, 2, 3 or 4 different blocks of data per trunk. In other words, the system is capable of working with trunks even if they are not completely full.

The memory bank scheduler 142 maps the trunks in the current VOQ into available banks in the SDRAM 32. By keeping the trunks in interleaved bank order (per VOQ), both the writing to the SDRAM 32 and the eventual reading from the SDRAM is extremely fast. One reason for this is because, when the SDRAM 32 is accessed in an interleaved fashion, the access time across different banks can be overlapped in portions of the access cycles, which results in a higher data transfer rate. This is especially important when the goal of the network device is to have high speed.

Figure 5:
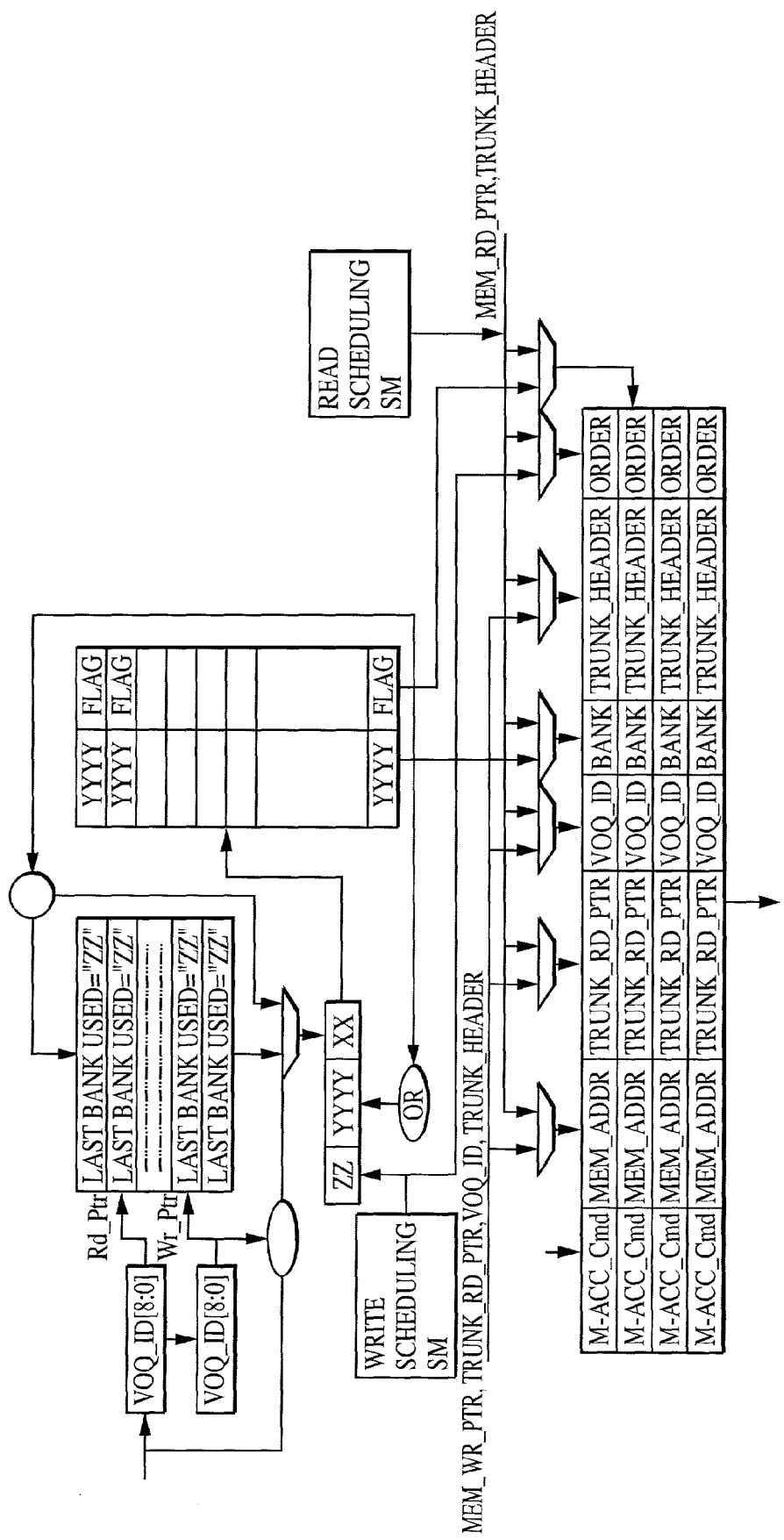
FIGS. 5 and 6 are block diagrams showing an example of how trunks of data can be assigned to memory banks in the network processing device according to an embodiment of the invention.
Figure 6:
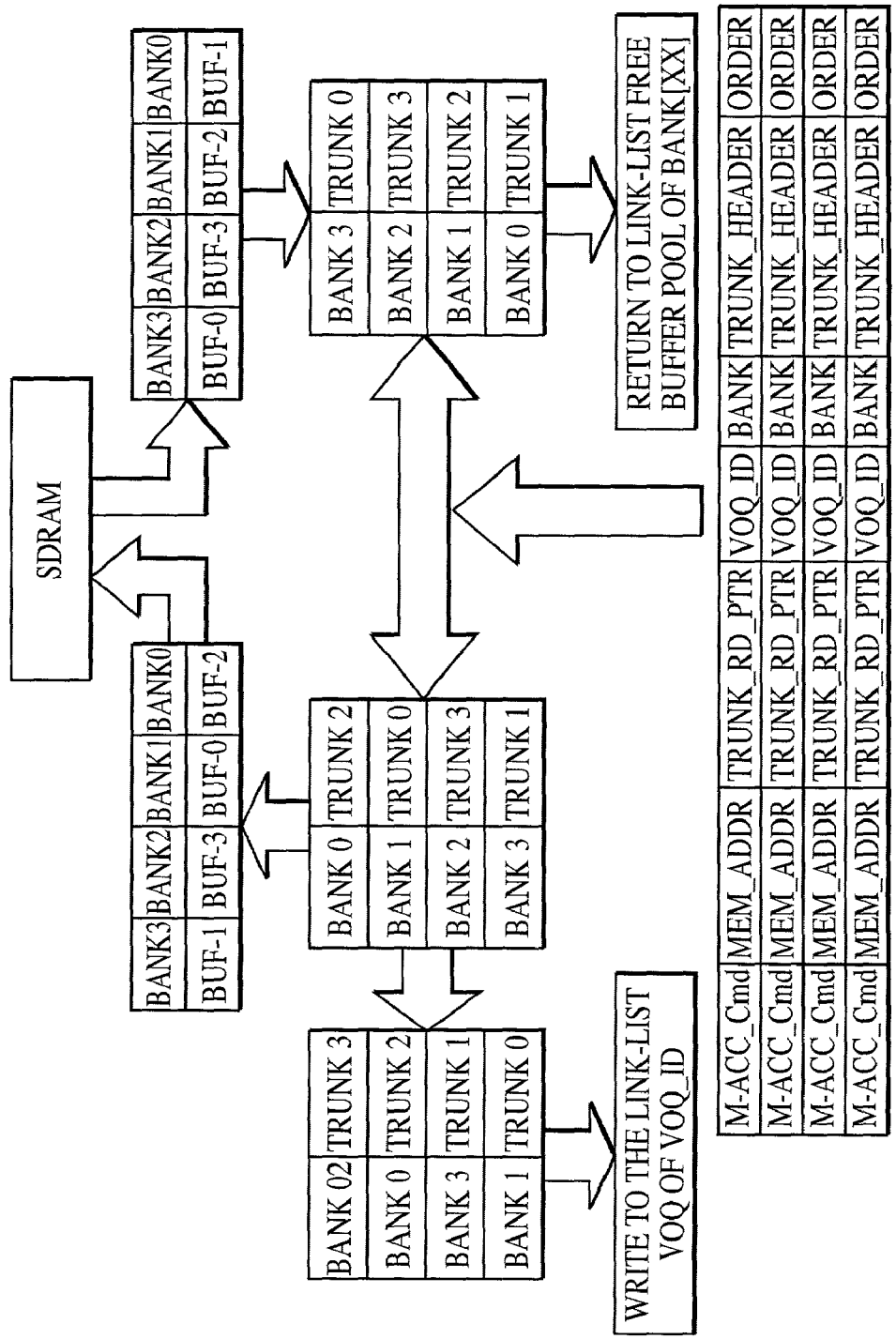
Figure 7B:
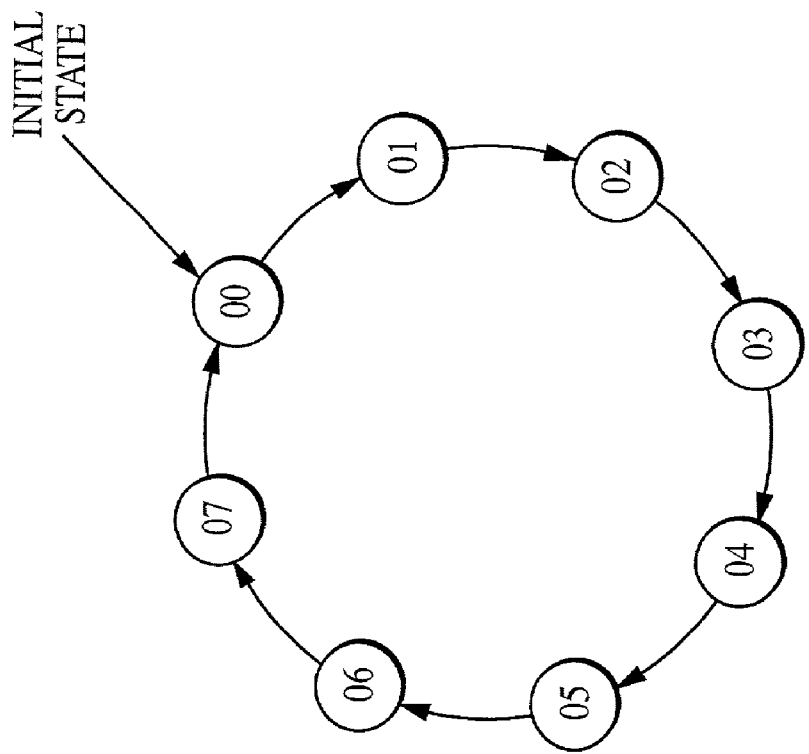
FIGS. 7A and 7B are state diagrams used in conjunction with the buffering system of embodiments of the invention.
Figure 7A:
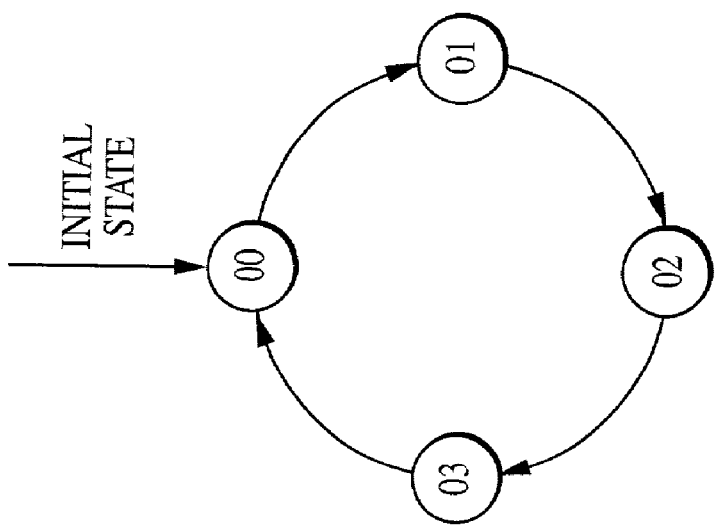

FIGS. 5 and 6, in conjunction with the functional blocks shown in FIG. 2, illustrate one method of scheduling where to put the trunk data and how to extract the VOQ data from the memory banks within the SDRAM 32. The memory bank scheduler first determines which bank in the SDRAM 32 was the last used for the particular VOQ. Once determined, the memory bank scheduler 142 uses a state machine, for example the state machine shown in FIGS. 7A or 7B, to initially determine which bank should be scheduled to receive the next current trunk to be written. The number of states in the state machine will match the number of banks used in the SDRAM 32. For instance, if the SDRAM 32 is accessed with four banks, there will be four states in the state machine, 00, 01, 02 and 03, as shown in FIG. 7A. The SDRAM 32 could also be accessed with eight banks, or any other appropriate number, so long as the state machine was appropriately matched. The state machine in FIG. 7B, which has eight states, would be used in this scenario. In addition to selecting a bank, a second check is performed to ensure that the bank selected by the state machine will not conflict with the last banks accessed or others to be accessed. Because in an SDRAM only a single bus is used for both reading and writing, scheduling in which banks to store the trunks must take into account the other banks being accessed for either other read or write operations. Obviously, the particular bank numbers that service a read request cannot be scheduled in advance, as the data that needs to be read is stored in only a specific bank or banks. Write requests, however, can be scheduled to take advantage of the high data throughput of a SDRAM. For instance, if the latest read request included reading data from bank 00, then the bank 00 would not be used for a write request in the same or next memory access cycle. This second check can be performed and problems with banks resolved in many different ways, such as by the use of another round robin state machine within the memory bank scheduler 142. Additionally, the memory bank scheduler 142 can use look ahead functions to resolve potential conflicts in bank allocation before they arise.

Once the state machine process selects the best bank or banks to store the trunks, the memory bank selector 142 determines which memory locations within the one or more banks will hold the trunk data. These memory locations are stored in a linked list in the queue memory, such as a QDR SRAM 148 (FIG. 2). The first memory location in the linked list is stored on the top of a free buffer queue (FBQ) for the particular bank selected. The memory bank scheduler 142 uses this address when it stores the first of the trunk data into the SDRAM 32. The head of the linked list points to a memory location in the QDR SRAM 148. In some embodiments of the QDR SRAM 148, the address of the memory location is also the address of the data stored in the SDRAM 32, for the particular trunk. The content of the address of the memory location pointed to by the head of the linked list is a second pointer that points to another memory location in the QDR SRAM 148. This second pointer is the address of the second portion of data in the trunk, and also corresponds to the address in the QDR SRAM 148 holding a third pointer. The linked list continues in this manner until the tail of the list is stored in a final location pointed to by the next-to-last entry.

In the embodiment described above, a relationship between the size of the QDR SRAM 148 and the SDRAM 32 can be optimized. That relationship is that the SDRAM 32 is most easily implemented when it is "x" times as large as the QDR SRAM 148, where "x" is the size of a full trunk, discussed with reference to FIG. 3, above. In that example the trunk size is 192 bytes, so the SDRAM 32 would be 192 times as large as the QDR SRAM 148. In this way, each trunk is stored in a memory location of the SDRAM 32 that is 192 bytes in size. The address of these 192 byte memory locations is a pointer to the address of the QDR SRAM 196.

Once the proper address in the SDRAM 32 for the particular VOQ is determined, the memory bank scheduler 142 communicates with a memory access controller 144 to move the current trunk into that address of the SDRAM 32. Information provided to the memory access controller 144 includes at least a command (write/read), the memory address in the SDRAM 32, the memory address of the current trunk location in the write combine buffer 134 (when writing data to the SDRAM 32), the trunk header information, the identification of the VOQ, the bank number selected by the state machine, and the order of the trunks. Once the memory access controller 144 has the necessary information, it reads the trunk data from the write combine buffer 134 and writes it to the SDRAM 32 using standard memory techniques. Then the memory access controller 144 reports to the trunk buffer manager 138 that the current trunk has been read from the write control buffer 134 and can be deleted from the write control buffer. The trunk buffer manager 138 then returns the read pointers of the current trunk back to the FBP so that they can be used again (as write pointers) and updates all of the necessary data, headers, and pointers in the trunk buffer manager 138 to remove reference to the trunk just read. Additionally, the linked list of the bank pointers for the particular VOQ written in the SDRAM 32 is also updated to reflect the addition of the new bank or banks for that particular VOQ. In other words, pointers to the bank or banks just added to the SDRAM 32 for that VOQ need to be added just before the current tail of the previous linked list for the particular VOQ. As discussed above, this linked list is stored in the QDR SRAM 148.

By writing data into the SDRAM 32 in this manner, data can eventually be read from the SDRAM very quickly. For example, when the scheduler 44 (FIG. 1) determines that the data for a particular VOQ is ready to be sent through the switch fabric 34, the scheduler communicates with the memory access controller 144 to read data from the SDRAM 32. The memory access controller is able to read data for the particular VOQ in a burst mode (reading more than one bank at the same time) because it was previously stored into the SDRAM 32 to be aligned in bank order. Burst mode reading of the SDRAM 32 makes reading the VOQ data extremely fast. Once the data is read from the SDRAM 32, the linked lists of pointers that are stored in the QDR SRAM 148 is updated accordingly, and the free pointers are available for other trunks to be stored in the SDRAM.

Any other method to speed up access of writing data to and/or reading data from the SDRAM 32 can be used in conjunction with these techniques. For instance, using "vertical" reading and writing techniques for the SDRAM 32 may increase memory speed access and are specifically contemplated.

Additionally, decisions about how to best manage each VOQ within the SDRAM 32 can be made in conjunction with a weighted fair queuing (WFQ) manager 150, shown in FIG. 2. Decisions by the WFQ manager 150 such as which queue or queues will handle more data throughput, and how much data to include for each queue prior to closing the VOQ and outputting the data through the switch fabric 34 can be easily made in conjunction with the described buffer management system. The WFQ manager 150 can also make decisions about prioritizing packets, and can communicate these priorities to the memory bank scheduler 142.

Balancing access bandwidth to and from the SDRAM 32 can improve the overall data flow through the network device. Embodiments of the invention use a dynamic balancing to maximize memory resources.

In embodiments of the invention, the dynamic balancing of the SDRAM 32 access is epoch based. An epoch is a time interval during which packets with a common switching input port and a common switching output port can pass through the core of the switch fabric 34. This system is preferable to one where the switch fabric 34 is individually changed for each packet as was done in early network devices. In the dynamic system, each epoch time slot contains N burst read and write cycles. Each burst contains M number of trunks. Therefore, in one epoch, N×M number of trunks can be serviced. To maintain proper flow in the dynamic system, write access to the SDRAM 32 is given higher priority than read access in each epoch. One system capable of enabling write access to have priority over read access is through the use of a token register. In such a token register, a given number of tokens are assigned per epoch, each token representing the time needed to access the SDRAM 32 and read or write 1 trunk. For each epoch, 1 token is assigned for every trunk scheduled for writing to the SDRAM 32. If there are tokens remaining in the token register after all of the scheduled write accesses have received their tokens, the remaining tokens are allocated for read accesses, if any. If tokens remain after the read accesses are allocated, then idle cycles are used and the SDRAM 32 remains idle for those tokens. In this way, a constant total number of tokens is maintained for every read/write cycle (every epoch). At the beginning of every epoch, each of the tokens in the token register is reallocated to the scheduled cycles, with write cycles always taking precedence over read cycles.

Using the Output High Speed RAM

Once trunks of data are read out of the input SDRAM 32 they pass through the switch fabric 34 (FIG. 1) on their way to the desired output port to be sent back on the Internet 20. As mentioned above, the trunks of data may also be temporarily stored in an output memory device, such as the SDRAM 36 (FIG. 1) after passing through the switch fabric 34. In some instances, storing the trunks in the output SDRAM 36 is an easier task than storing them into the input SDRAM 32 because, by the time the trunks have passed through the switch fabric 34, they are already aligned in the linked lists of the VOQs. This is true if there are a limited number of output ports on the egress path. Therefore, in this case, the output buffer manager 46 needs only to break the linked list of the VOQs into bank boundaries and store the resultant trunks in the appropriate locations of the SDRAM 36. The state machine method, described above with reference to the SDRAM 32 and shown in FIGS. 7A and 7B, can generate the bank boundaries for the SDRAM 36. Or, other methods could be used.

If, however, there are a large number of output ports, then it is better to realign the data previously stored in the SDRAM 32 (in the VOQs) to better match the number of output ports and maintain a high packet throughput. In these instances, the same buffer management techniques as described above with reference to the ingress portion of a network device can also be applied to the egress portion. Indeed, in many instances, a duplicate copy of the input buffer manager 42 can be used to provide an egress path, just like the ingress path described above with reference to FIG. 2.

Figure 8:
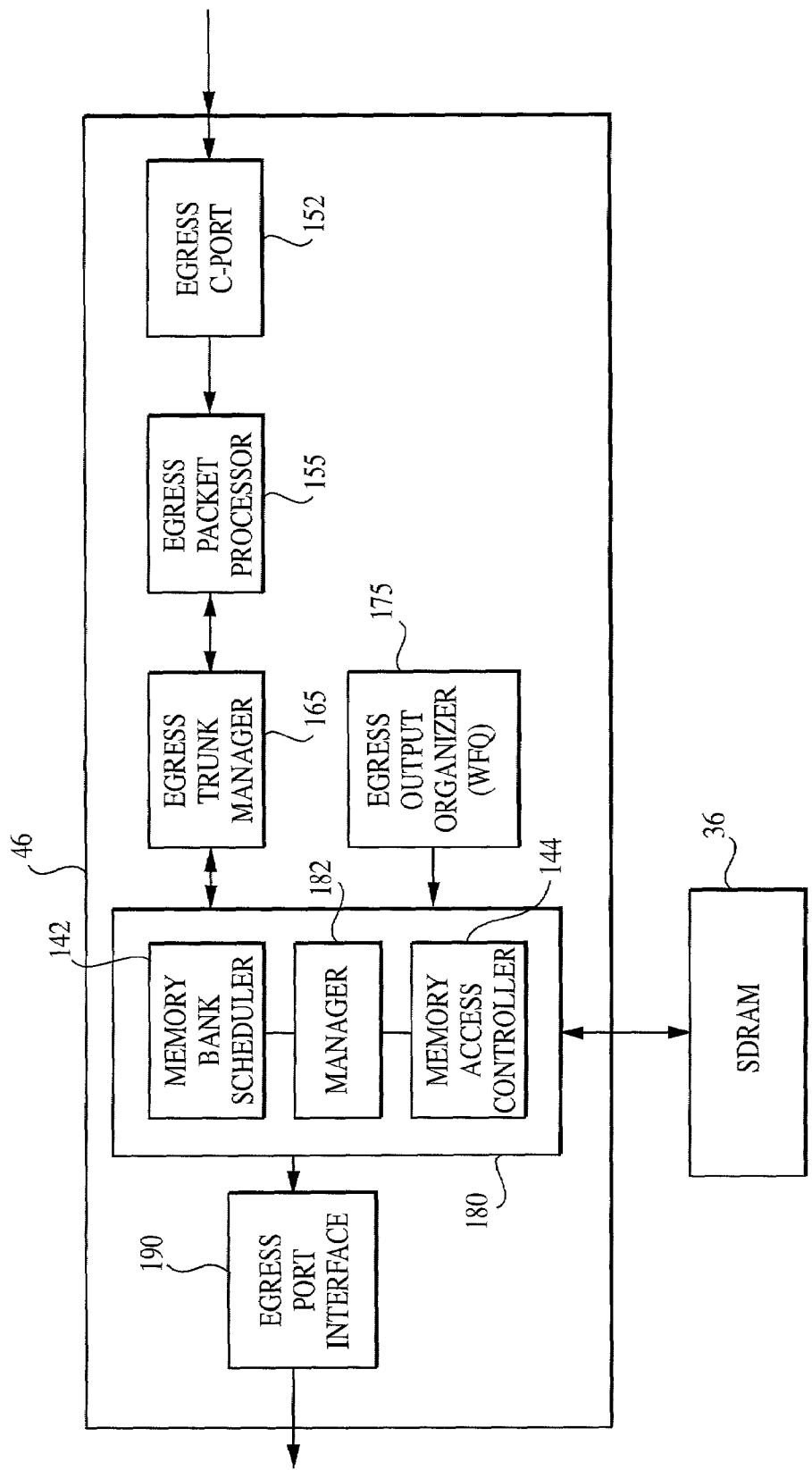
FIG. 8 is a functional block diagram of components of the network processing device shown in FIG. 1.

Specifically, FIG. 8 shows the output buffer manager 46, which in this instance has the same function as, and may even be an exact copy of the buffer manager 42 of FIG. 2. Instead of packets arriving from an input port, they are sent directly from the switch fabric 34 (FIG. 1) to an egress C-port 152. These packets are processed by an egress packet processor 155, then aligned on trunk boundaries and temporarily stored in an egress trunk manager 165. The egress trunk manager 165 communicates with an egress buffer manager 180 to store the newly realigned data in the SDRAM 36, similar to how it was stored in the SDRAM 32 for the ingress portion, described above. One difference, however, is that the data will be stored in differently aligned trunks, to be able to take advantage of the large number of output ports.

Central to the buffer manager 46 is the egress buffer manager 180. The egress buffer manager 180 has a function similar or identical to the ingress buffer manager 140 shown in FIG. 2. The egress buffer manager 180 includes a memory bank scheduler 142 and a memory access controller 144 that coordinate where trunks of data that have already passed through the switch fabric 34 will be stored in the SDRAM 36. Additionally, the management circuitry 182 provides support functions that allow the egress buffer manager 180 to operate. This management circuitry 182 contains, for example, timing circuits, VOQ managers, pointers, state machines, etc. The egress buffer manager 180 also coordinates with an egress output organizer (WFQ) 175 to ensure that packets are handled correctly and with proper priorities, etc. Finally, the buffer manager 46 also includes an egress port interface, or traffic shaper 190 that ensures that packets are smoothly delivered at a programmable rate to the packet processor 30 (FIG. 1) to eventually be placed on the Internet 20.

In the system described immediately above, where the packets must be realigned into the SDRAM 36 from how they were stored in the SDRAM 32, two physical chips can be used, one containing the input buffer manager 42 (FIG. 2) and one containing the output buffer manager 46 (FIG. 8). These chips could be identical copies of one another. In the other system described above, i.e., where the trunks of data in the SDRAM 32 are simply copied into the SDRAM 36 after passing through the switch fabric 34 (FIG. 1) prior to being sent to the packet processor 30 (FIG. 1), the output buffer manager 46 can be modified from the way it is depicted in FIG. 8. One modification can include removing the egress trunk manager 165 from the output buffer manager 46. Because the packets being stored into the SDRAM 36 have already been aligned in trunks (when they were input into the SDRAM 32 (FIG. 2)), there is no need to have a second trunk manager. Also, if there is no egress trunk manager 165, the output buffer manager can be made small enough to incorporate it on the same physical chip as the input buffer manager 32 of FIG. 2.

System Summary

By using the inventive techniques for buffering data within a network device, packet data traffic can be greatly increased over devices that do not use such techniques. Additionally, the techniques described herein are scaleable and can be used with any number or combination of memories within a network device. Further, the techniques described can be used in addition to other techniques for speeding data traffic through a network device.

Figure 9:
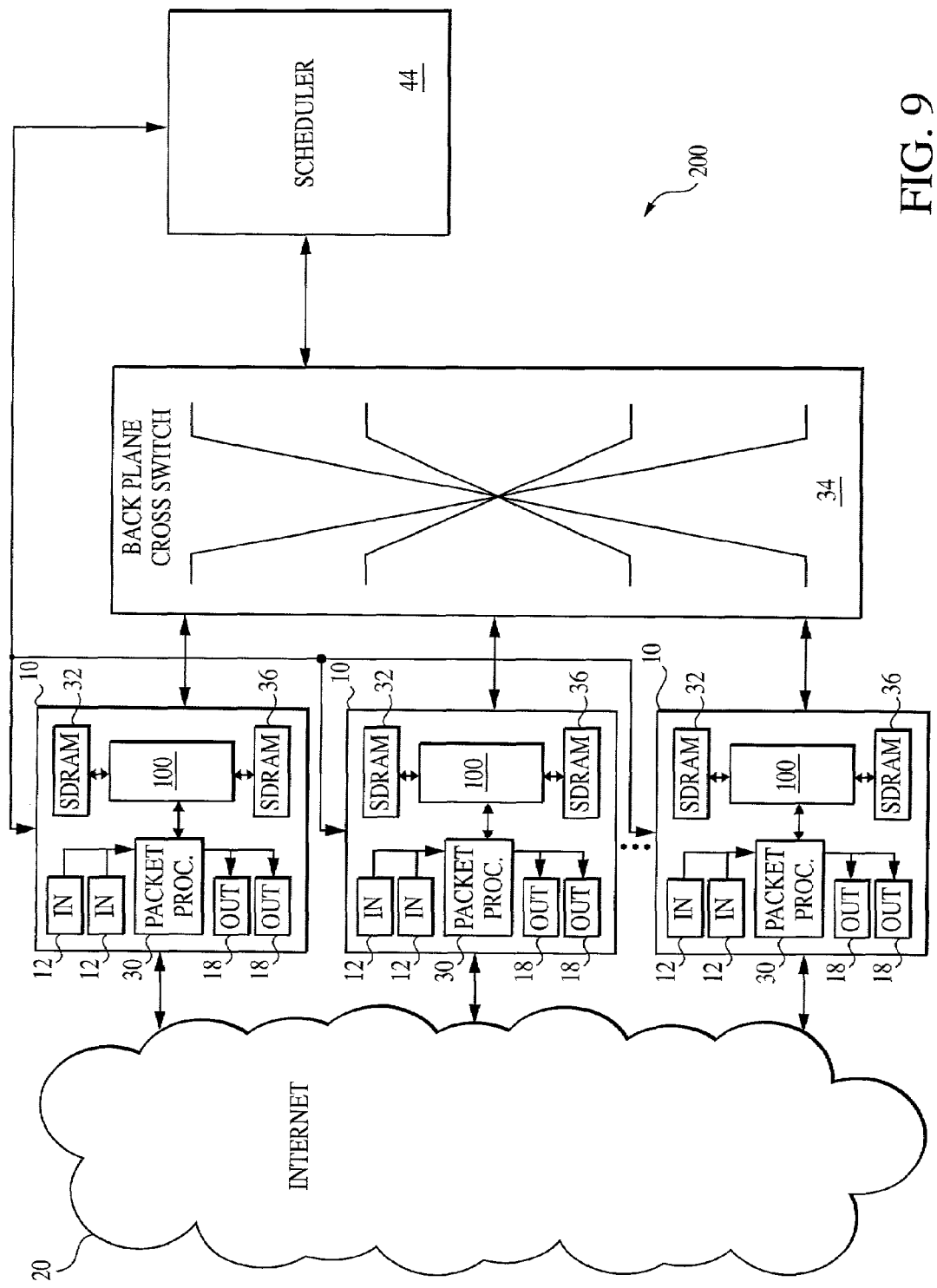
FIG. 9 is a block diagram of a network processing device that uses high efficiency data buffering.

FIG. 9 is an example block diagram showing a network device 200. The network device 200 contains several LICs 10, each of which is coupled to the Internet 20. Each LIC 10 includes physical input ports 12 and output ports 18 to physically transfer the data packets, as is known in the art. Although three LICs 10 are illustrated in FIG. 9, any number of LICs may be present in the network device 200.

Included in each IC is a controller 100 that handles storing the data from the time it is received by the packet processor 30, until the time when it is being sent back out of the network device 200. The controller 100 may include a single chip solution that includes both input and output buffer managers 42, 46, or each of the buffer managers may be implemented as its own separate chip and having different configurations.

In operation, when trunks of data in the VOQs are stored in the SDRAM 32 of a LIC 10, the switch fabric scheduler 44 directs the packets through the switching fabric 34 to transfer the packets to the desired egress buffer SDRAM 36. The egress WFQ 175 (FIG. 8) in the output buffer manager 46 schedules the packet from the egress buffer VOQ's (stored in the SDRAM 36) to the desired destination port 18 (FIG. 9). Packets from one LIC 10 may be returned to any of the other LICs 10 after passing through the switching fabric 34, including the LIC 10 that originated the packet. As described above, the packets may be stored in the egress SDRAM 36 prior to being sent through the proper output port 18 and directed back on the Internet 20.

Figure 10:
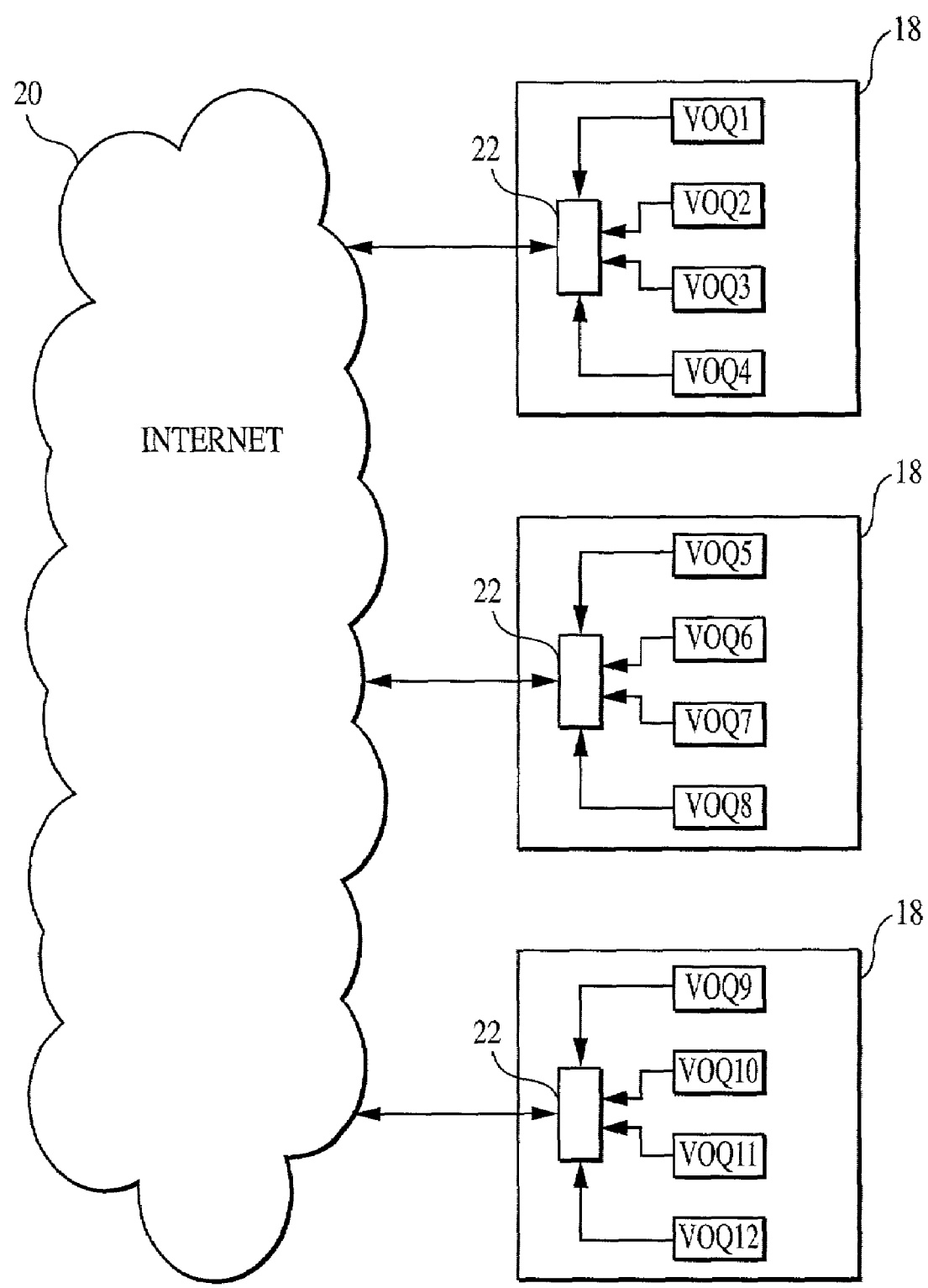
FIG. 10 is a block diagram of output ports of the network processing device of FIG. 9.

An example diagram showing how VOQs relate to the output ports 18 is shown in FIG. 10. In FIG. 10, three output ports 18 are represented. These output ports 18 could be all on one LIC 10 of FIG. 9, or could be on different LICs. Each output port 18 has a physical transmitter 22, which is physically linked to the Internet 20. The transmitter 22 receives data from one of its attached VOQs as input, makes an appropriate signal and puts the signal on the Internet 20. Only data from one of the VOQs can be sent through a transmitter 22 at any given time; the other VOQs attached to the same transmitter 22 remain idle. Generally, the egress WFQ 175 (FIG. 8) makes the decisions about which transmitter 22 is servicing which VOQ. Although FIG. 10 shows each output port 18 having four VOQs, there could be more or fewer than four VOQs so assigned. Additionally, FIG. 10 shows each VOQ assigned to only one transmitter 22, wherein in practice any VOQ can be serviced by any of the transmitters 22 by the appropriate action of the egress WFQ 175.

Having described and illustrated the principles of the invention in a preferred embodiment thereof, it should be apparent that the invention could be modified in arrangement and detail without departing from such principles. I claim all modifications and variation coming within the spirit and scope of the following claims.

The invention claimed is:

1. A buffer manager, comprising:
    an input for receiving packets of data, each packet associated with an output queue;
    an intermediate storage facility having a plurality of blocks;
    an intermediate storage facility manager configured to assign particular blocks of the intermediate storage facility to buffer packet data according to destination output queues, and store one or more packets associated with the output queues into the blocks assigned to those output queues;
    a queue memory; and
    a second storage facility manager coupled to the intermediate storage facility manager and configured to accept a command from the intermediate storage facility manager and, upon receipt of the command, store into the queue memory one or more groups of blocks that were previously stored in the intermediate storage facility, the second storage facility manager comprising a memory access controller coupled to the queue memory and a memory bank scheduler coupled to the memory access controller and configured to direct portions of groups of blocks to particular banks of the queue memory.

2. A buffer manager according to claim 1 wherein the intermediate storage facility manager comprises:
    a pointer repository for tracking locations in the intermediate storage facility;
    a trunk manager configured to interact with the pointer repository to store locations of trunks stored in the intermediate storage facility.

3. A buffer manager according to claim 2 wherein each trunk managed by the trunk manager is made of one or more blocks of the intermediate storage facility having a common output queue.

4. A buffer manager according to claim 2 wherein the intermediate storage facility manager further comprises a temporary storage memory circuit for storing the packets of data prior to the time that the packets of data are stored in the intermediate storage facility.

5. A buffer manager according to claim 1 wherein the intermediate storage facility is an SRAM circuit.

6. A buffer manager according to claim 1 wherein the output queues are virtual output queues sharing a common queue memory.

7. A buffer manager according to claim 1, wherein the second storage facility manager comprises a dynamic balancer, including:
    a token register including a number of tokens,
    a token distributor configured to allocate the number of tokens between read and write process managers,
    the write process manager configured to accept a number of write tokens from the token distributor and authorize a number of data write operations to the queue memory equal to the number of write tokens received, and
    the read process manager configured to accept a number of read tokens from the token distributor and authorize a number of data read operations to the queue memory equal to the number of read tokens received.

8. A buffer manager according to claim 7 wherein the dynamic balancer is configured to force all of the number of data write operations to be performed before any of the data read operations are performed.

9. A buffer manager according to claim 1, further comprising an output queue manager configured to supervise output queues made of one or more trunks.

10. A buffer manager according to claim 1 wherein the queue memory is an SDRAM circuit.

11. A buffer manager according to claim 1, further comprising a third storage facility coupled to the second storage facility manager, the third storage facility able to store groups of blocks that were previously stored in the queue memory.

12. A buffer manager according to claim 1, further comprising:
an output SDRAM storage circuit;
an output SDRAM controller coupled to the second storage facility manager, the output SDRAM controller circuit configured to store trunks of data that were previously stored in the queue memory.

13. A line interface card, comprising:
one or more input ports configured to receive packets;
one or more output ports configured to transmit packets; and
a packet buffer manager, including
a buffer memory having blocks of storage locations;
a buffer memory manager configured to sort the data packets into groups and store the groups into the buffer memory blocks, wherein the data packets are sorted into groups having common assigned output queues for storage into the buffer memory blocks;
a block storage memory comprising the output queues to receive the grouped packet data from the buffer memory; and
a block storage memory manager coupled to the buffer memory manager, comprising a memory access controller coupled to the block storage memory and a memory bank scheduler coupled to the memory access controller and structured to direct portions of the one or more groups of blocks to particular banks of the block storage memory.

14. A line interface card according to claim 13, further comprising a second block storage memory coupled to the buffer memory manager, the second block storage memory able to store groups of blocks that were previously stored in the block storage memory.

15. A line interface card according to claim 13, further comprising:
an output SDRAM storage circuit;
an output SDRAM controller coupled to the block storage memory manager, the output SDRAM controller circuit structured to store trunks of data that were previously stored in the block storage memory.

16. A line interface card according to claim 13 wherein the computer network is the Internet.

17. A line interface card according to claim 13 wherein the buffer memory manager further comprises a temporary storage memory circuit for storing the packets of data prior to the time that the packets of data are stored in the buffer memory.

18. A line interface card according to claim 13, further comprising a packet processor coupled to one or more of the input ports and output ports.

19. A network device, comprising:
one or more input ports;
one or more output ports;
a switching fabric connecting selected input ports to selected output ports;
a packet buffer manager, including
a buffer memory having a plurality of storage location blocks,
a buffer memory manager configured to sort data packets accepted from the input ports into groups and store the groups into one or more of the plurality of the storage location blocks in the buffer memory, wherein the data packets are sorted into groups having common assigned output queues for storage into the buffer memory blocks,
a block storage memory comprising the output queues to receive the grouped packet data from the buffer memory, and
a block storage memory manager coupled to the buffer memory manager, comprising a memory access controller coupled to the block storage memory and a memory bank scheduler coupled to the memory access controller and configured to direct portions of groups of blocks to particular banks of the block storage memory; and
a scheduler configured to direct the packet buffer manager to output the groups through the switching fabric.

20. A network device according to claim 19 wherein the block storage memory manager is configured to accept a command from the buffer memory manager and, upon receipt of the command, store into the block storage memory one or more groups of blocks that were previously stored in the buffer memory.

21. A network device according to claim 19, further comprising a second block storage memory coupled to the buffer memory manager, the second block storage memory able to store groups of blocks that were previously stored in the block storage memory.

22. A network device according to claim 19, further comprising:
an output SDRAM storage circuit;
an output SDRAM controller coupled to the block storage memory manager, the output SDRAM controller circuit structured to store trunks of data that were previously stored in the block storage memory.

23. A network device according to claim 19 wherein the computer network is the Internet.

24. A network device, comprising:
one or more input ports structured to accept data packets from a computer network, each packet having an assigned output queue;
one or more output ports structured to send data packets onto the computer network;
a switching fabric coupled to the one or more input ports and the one or more output ports and structured to connect selected input ports to selected output ports;
a packet buffer manager, including
an input coupled to the one or more input ports,
a buffer memory having a plurality of storage location blocks, each block able to store at least a portion of the data packets accepted from the one or more input ports,
a buffer memory manager structured to sort the data packets accepted from the one or more input ports into groups, store the groups into one or more of the plurality of the storage location blocks in the buffer memory, and retrieve one or more of the stored groups, wherein the data packets are sorted into groups having common assigned output queues for storage into the buffer memory blocks,
a block storage memory comprising the output queues to receive the grouped packet data from the buffer memory, and
a block storage memory manager coupled to the buffer memory manager, comprising a memory access controller coupled to the block storage memory and a memory bank scheduler coupled to the memory access controller and configured to direct portions of groups of blocks to particular banks of the block storage memory; and
a scheduler coupled to the packet buffer manager and to the switching fabric, the scheduler structured to direct the packet buffer manager to read one or more of the stored groups and to direct the groups read from the buffer memory through the switching fabric.

25. A method for buffering packet data in a network device, comprising:
- receiving data packets at an input port, each data packet having a predetermined output queue;
- aligning the data packets into groups of packet data, each group comprising packet data having the same output queue, wherein aligning the data packets into packet data groups each having the same output queue comprises
  - determining a required number of blocks in the memory buffer to store the packet data having the same output queue,
  - obtaining addresses of the required number of free blocks in the memory buffer, and
  - creating an ordered list of the addresses obtained;
- buffering the packet data groups in the blocks of a memory buffer arranged by blocks; and
- selecting buffered packet data groups for storage in a memory device comprising the output queues.

26. A method for buffering packet data according to claim 25, further including creating a list of the blocks used to store the grouped packet data having the same output queues.

27. A method for buffering packet data according to claim 25, further comprising, upon receiving a signal:
- reading a selected packet data group previously stored in the blocks of the memory buffer; and
- removing the read grouped data packets from the memory buffer.

28. A method for buffering packet data according to claim 27 that further comprises storing the selected packet data group in the memory device after the selected packet data group has been read from the memory buffer.

29. A method for buffering packet data in a network device, comprising:
- receiving data packets at an input port, each data packet having a predetermined output queue;
- aligning the data packets into groups of packet data, each group comprising packet data having the same output queue, wherein aligning the data packets into packet data groups each having the same output queue comprises
  - determining a required number of blocks in the memory buffer to store the packet data having the same output queue,
  - requesting pointers to the required number of free blocks in the memory buffer from a free block pool, and
  - creating a linked list of the pointers obtained from the free block pool;
- buffering the packet data groups in the blocks of a memory buffer arranged by blocks; and
- selecting buffered packet data groups for storage in a memory device comprising the output queues.

30. A method for buffering packet data according to claim 29, further comprising:
- receiving an additional packet at the input port, the additional packet having the same output queue as a packet data group currently stored in the memory buffer; and
- storing packet data from the additional packet in the packet data group in the memory buffer and having the same output queue.

31. A method for buffering packet data according to claim 30 wherein storing packet data from the additional packet in the packet data group comprises adding additional pointers to a linked list representing the blocks in the memory buffer assigned to the packet data group.

32. A method for buffering packet data according to claim 28 wherein storing the selected packet data group in the memory device comprises storing the selected packet data group in an SDRAM memory device as a single unit.

33. A method for buffering packet data according to claim 27 wherein the signal is generated when one of the following conditions is true:
- when a pre-set time after storing the selected packet data group in blocks of the memory buffer has elapsed; or
- when an amount of data stored in the blocks of the memory buffer equals or exceeds a threshold.

* * * * *